E. R. HILL.
COMBINED PLOW AND FERTILIZER DISTRIBUTER.
APPLICATION FILED AUG. 14, 1913.
1,125,021.
Patented Jan. 12, 1915.
3 SHEETS—SHEET 1.
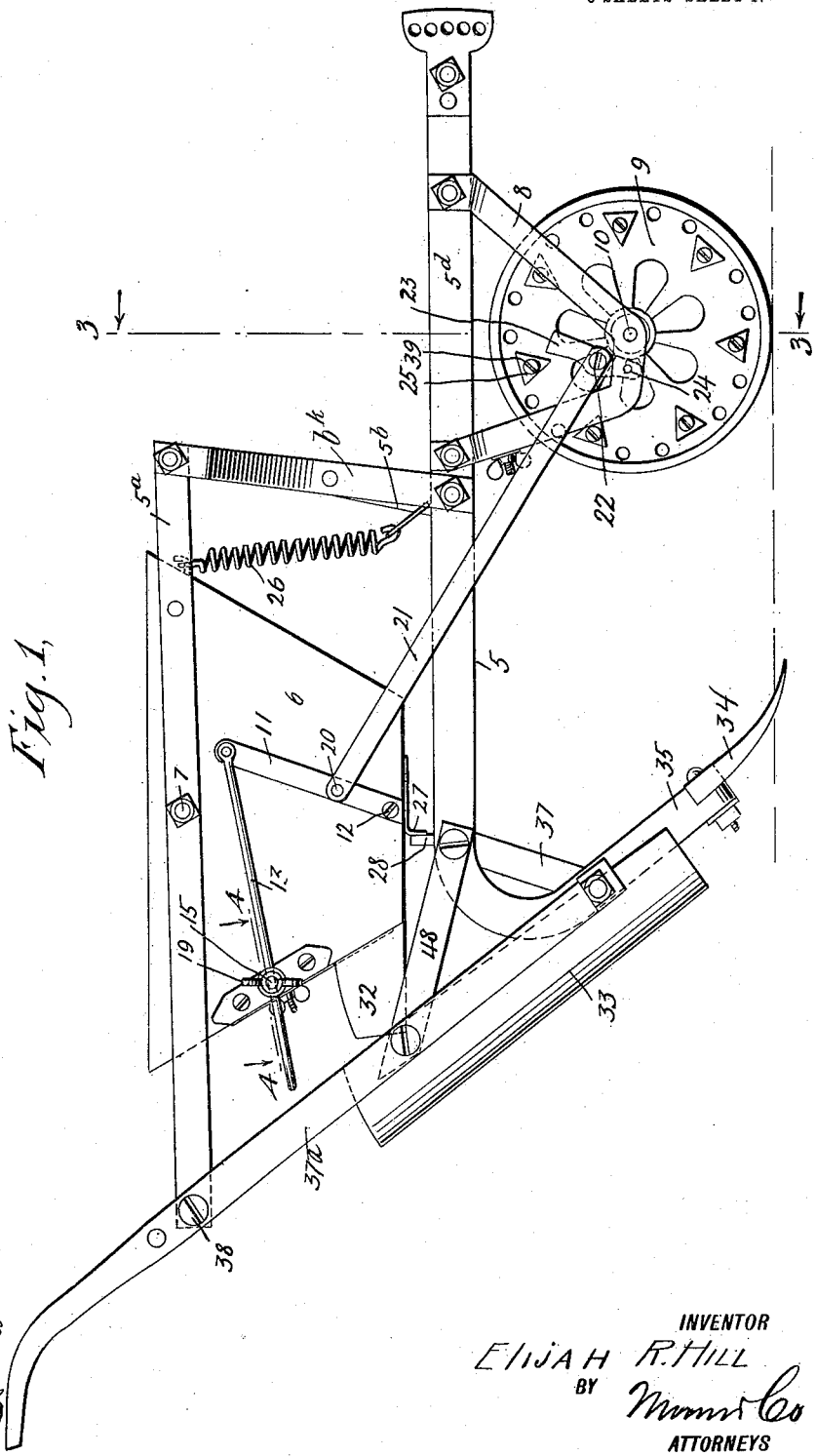
WITNESSES
INVENTOR
ELIJAH R. HILL
BY
ATTORNEYS

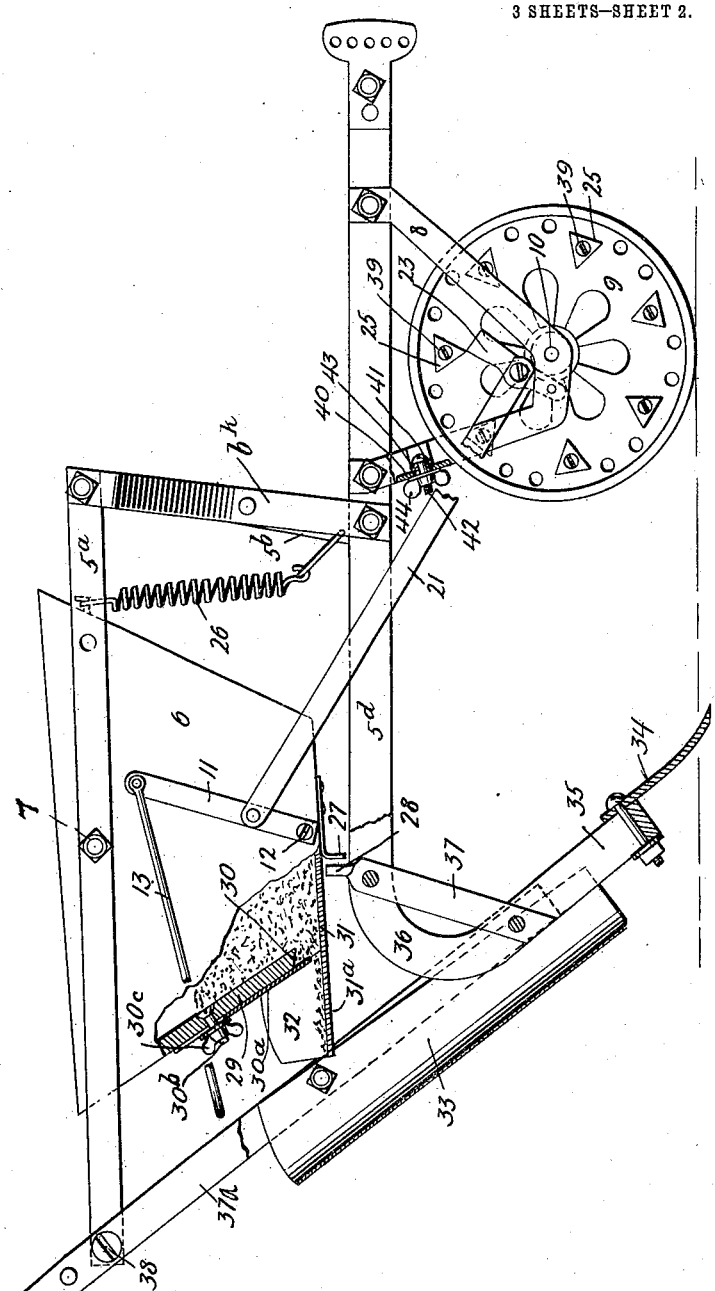

E. R. HILL.
COMBINED PLOW AND FERTILIZER DISTRIBUTER.
APPLICATION FILED AUG. 14, 1913.
1,125,021.
Patented Jan. 12, 1915.
3 SHEETS—SHEET 3.
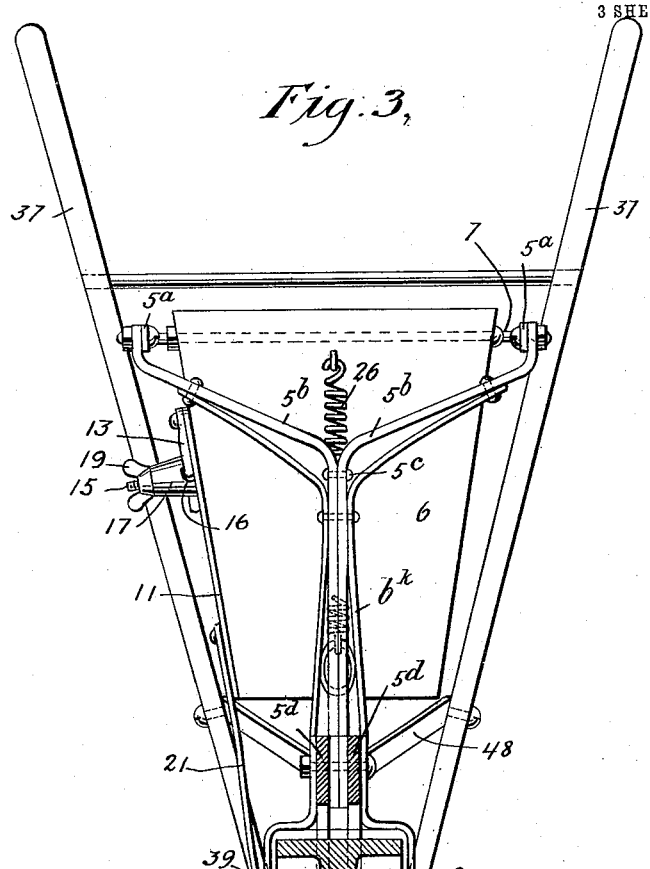
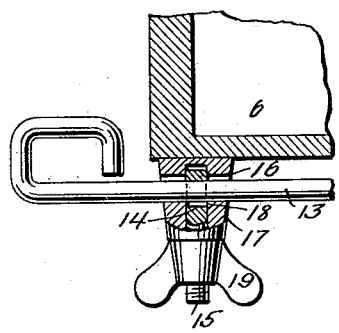
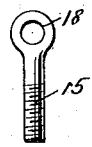
WITNESSES
INVENTOR
Elijah R. Hill
BY
ATTORNEYS

UNITED STATES PATENT OFFICE.

ELIJAH ROBERTSON HILL, OF NEW ALBANY, MISSISSIPPI.

COMBINED PLOW AND FERTILIZER-DISTRIBUTER.

1,125,021.   Specification of Letters Patent.   Patented Jan. 12, 1915.

Application filed August 14, 1913. Serial No. 784,750.

*To all whom it may concern:*

Be it known that I, ELIJAH R. HILL, a citizen of the United States, and a resident of New Albany, in the county of Union and State of Mississippi, have invented a new and Improved Combined Plow and Fertilizer-Distributer, of which the following is a full, clear, and exact description.

My invention relates to plows and means for distributing commercial fertilizers, it being possible to remove the fertilizer distributing attachment, so that the device may be used as a plow without it being necessary to transport the fertilizer distributer.

The device is constructed with a fertilizer hopper pivoted on a frame and having an outlet with a slide for regulating the size of the outlet. To the hopper there is pivoted an arm which is held in adjusted position relatively to the hopper by means provided therefor, and the hopper is rocked by a link articulated to the arm and to a trip pivoted to the frame, the trip being disposed in the path of a trip member secured to a supporting wheel for the frame. By adjusting the position of the arm, the extent of the movement of the hopper may be regulated. Mounted on the frame there is a drill opener and adjacent the drill opener, there is a conduit, leading from the opening in the hopper.

Still further objects of the invention will appear in the following complete description, in which the preferred form of the invention is disclosed.

In the drawings similar reference characters indicate corresponding parts in all the views, and in which—

Figure 1 is a side elevation of the invention; Fig. 2 is also a side elevation of the invention, similar to that shown in Fig. 1, but with parts broken away to illustrate the working of the device; Fig. 3 is a sectional view on the line 3—3 of Fig. 1; Fig. 4 is a fragmentary sectional view, showing the means for adjusting the position of the arm by which the hopper is regulated; and Fig. 5 is a view, showing the eye bolt used in connection with the fastening means illustrated in Fig. 4.

By referring to the drawing it will be seen that the frame 5 has main frame members $5^d$, between which are secured the lower ends of the frame members $5^b$, these frame members $5^b$ extending upwardly and outwardly with the frame members $5^a$ secured to their upper terminals. These frame members $5^a$ extend rearwardly and their rear ends are secured to the handles 37 at 38.

Reinforcing members $bk$ are secured to the outer sides of the frame members $5^b$ and to the outside of the main frame members $5^d$.

Disposed between the frame members $5^a$ and pivoted thereto at 7, there is a hopper 6, this hopper 6 being provided at its bottom with a flange 27 for engaging a stop 28 extending upward from the main frame members $5^d$ to limit the downward movement of the forward portion of the hopper 6.

The frame 5 has brackets 8 between which is disposed a supporting wheel 9 which is journaled in the brackets 8 at 10, this supporting wheel carrying the trip members 25 which are secured to the supporting wheel 9 by the screws 39. These trip members 25 are provided for actuating the trip 23, which is pivoted to one of the brackets 8, the trip 23 being connected by a link 21 with the arm 11, which is pivoted at 12 to the hopper 6. It will therefore be seen that when this arm 11 is secured relatively to the hopper 6 and the supporting wheel 9 is rotated, the trip members 25 will move the trip 23 to rock the hopper 6 through the link 21 and the arm 11, the extent of the movement of the hopper 6 being regulated by the position in which the arm 11 is held relatively to the hopper 6. As a means of securing the arm 11 in adjusted position relatively to the hopper 6, I provide a rod 13 which extends through an opening 16 in a stud 17 and through the eye 18 in the bolt 15, which is disposed in the opening 14 in the stud 17. A wing nut 19 meshes with the thread on the bolt 15, so that when the wing nut is turned against the stud 17, it will draw the bolt outward, clamping the rod 13 between the bolt at its eye 18 and one side of the opening 16 in the stud 17.

A spring 26 is provided which is secured to the frame members $5^b$ and the upper portion of the front of the hopper 6 to hold the front of the hopper yieldingly downward, this front portion of the hopper being moved upward when one of the trip members 25 engages the trip 23 to draw the link 21 forward. I prefer to construct the trip members 25 in triangular form so that the extended surfaces will be presented for engagement with the trip 23, the construction of the trip members 25, permitting of their being turned to present new surfaces when the surfaces which have been presented to the trip have become worn. The main frame members 5ᵈ are bent downward and forwardly at 36 and to the lower ends 35 of the main frame members 5ᵈ there is secured a drill opener 34. A brace 37 is secured at its upper end between the horizontal portions of the main frame members 5ᵈ and at its lower end between the depending portions 35 of the main frame members 5ᵈ and braces 48 extend from the main frame members 5ᵈ upwardly and rearwardly to the handles 37ª.

The rear wall 29 of hopper 6 has an opening 30, which feeds the fertilizer from the hopper to the extension 31ª of the hopper bottom 31. This extension 31ª of the hopper bottom 31 has sides 32 which converge rearwardly to direct the fertilizer to the conduit 33 which leads the fertilizer downward at the rear of the drill opener 34. The opening 30 may be partially closed if desired, by a slide 30ª, which is held in position by a bolt 30ᵇ and a wing nut 30ᶜ, so that when the wing nut 30ᶜ is turned home on the bolt 30ᵇ and against the slide 30ª, it will hold the slide in position.

A scraper 40 is disposed for engaging the supporting wheel 9 as may be desired, it being possible to adjust the position of this scraper 40 by means of the wing nut 44, which is provided for forcing the scraper 40 against a bracket 43, to which the bolt 42 is secured, with which the wing nut meshes. The bracket 43 is secured to the brackets 8 and the bolt 42 is disposed through an opening 41 in the scraper 40.

Having thus described my invention, I claim as new and desire to secure by Letters Patent:—

1. In a combined plow and fertilizer distributer, a horizontal frame member with its rear end bent down and forwardly, a vertical frame member secured to and extending upward from the horizontal frame member, two horizontal frame members secured to the vertical frame member and extending rearwardly above the horizontal plane of the first frame member, a drill opener secured to the rear terminal of the first mentioned horizontal frame member, handles secured to the horizontal frame members, a hopper pivoted between the second mentioned horizontal frame members, a supporting wheel mounted on the horizontal frame member and means in connection with the wheel for rocking the hopper.

2. In a device of the character described, a frame, a wheel mounted on the frame, a hopper pivoted to the frame, an angular trip pivoted to the wheel, means for securing the trip in adjusted position relatively to the wheel, a trip member mounted on the frame for engagement by the trip, and means connecting the trip member with the hopper for rocking the latter.

In witness whereof I have signed my name to this specification in the presence of two subscribing witnesses.

ELIJAH ROBERTSON HILL.

Witnesses:
JAMES E. TATE,
ARTHUR L. ROGERS.

Copies of this patent may be obtained for five cents each, by addressing the "Commissioner of Patents, Washington, D. C."